(12) United States Patent
Shi et al.

(10) Patent No.: US 10,545,896 B2
(45) Date of Patent: Jan. 28, 2020

(54) SERVICE ACCELERATION METHOD AND APPARATUS

(71) Applicant: Huawei Technologies Co., Ltd., Shenzhen (CN)

(72) Inventors: Ziliang Shi, Xi'an (CN); Qi Wang, Xi'an (CN); Tao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 15/639,274

(22) Filed: Jun. 30, 2017

(65) Prior Publication Data

US 2017/0300437 A1 Oct. 19, 2017

Related U.S. Application Data

(63) Continuation of application No. PCT/CN2015/100116, filed on Dec. 31, 2015.

(30) Foreign Application Priority Data

Dec. 31, 2014 (CN) .......................... 2014 1 0856653
Dec. 26, 2015 (CN) .......................... 2015 1 0999854

(51) Int. Cl.
G06F 13/36 (2006.01)
G06F 13/42 (2006.01)

(52) U.S. Cl.
CPC .............. *G06F 13/36* (2013.01); *G06F 13/42* (2013.01); *Y02D 50/10* (2018.01)

(58) Field of Classification Search
CPC ......... G06F 13/36; G06F 13/42; H04L 41/00; Y02D 50/10
See application file for complete search history.

(56) References Cited

U.S. PATENT DOCUMENTS

| 2013/0117766 A1* | 5/2013 | Bax ....................... G06F 9/4405 719/323 |
| 2013/0246944 A1* | 9/2013 | Pandiyan ................. G06F 9/54 715/760 |

(Continued)

FOREIGN PATENT DOCUMENTS

| CN | 101388785 A | * | 3/2009 |
| CN | 101388785 A | | 3/2009 |

(Continued)

*Primary Examiner* — Henry Tsai
*Assistant Examiner* — John B Roche
(74) *Attorney, Agent, or Firm* — Leydig, Voit & Mayer, Ltd.

(57) ABSTRACT

A service acceleration method is disclosed. The method includes: querying acceleration type information and information about an idle acceleration ability that are of the multiple acceleration engines, and forming an accelerator resource pool according to the acceleration type information and the information about the idle acceleration ability; after receiving an acceleration application of a first service processing unit in the multiple service processing units, allocating, from the accelerator resource pool according to a preset allocation granularity, a first idle acceleration ability and a connection number that are corresponding to the first acceleration ability and a first acceleration type; and feeding back a result packet that is obtained after acceleration processing to the first service processing unit. The method and the apparatus that are provided in the present invention resolve a prior-art problem of resource waste caused by inappropriate utilization of accelerator resources.

10 Claims, 5 Drawing Sheets

(56) References Cited

U.S. PATENT DOCUMENTS

2013/0290541 A1 10/2013 Hatasaki et al.
2016/0044118 A1 2/2016 Huang et al.

FOREIGN PATENT DOCUMENTS

| CN | 103269280 A | 8/2013 |
|----|-------------|--------|
| CN | 103281251 A | 9/2013 |
| CN | 103399758 A * | 11/2013 |
| CN | 103399758 A | 11/2013 |
| CN | 103473117 A | 12/2013 |
| CN | 103686852 A | 3/2014 |
| WO | 2013003381 A1 | 1/2013 |

* cited by examiner

SERVICE ACCELERATION METHOD AND APPARATUS

CROSS-REFERENCE TO RELATED APPLICATIONS

This application is a continuation of International Application No. PCT/CN2015/100116, filed on Dec. 31, 2015, which claims priority to Chinese Patent Application No. 201510999854.X, filed on Dec. 26, 2015, which claims priority to Chinese Patent Application No. 201410856653.X, filed on Dec. 31, 2014. The disclosures of the aforementioned applications are hereby incorporated by reference in their entireties.

TECHNICAL FIELD

Embodiments of the present invention relate to the field of electronic technologies, and in particular, to a service acceleration method and apparatus.

BACKGROUND

At present, different services on a communications network are generally deployed on different hardware. Therefore, on the communications network, many services are generally implemented on different special-purpose hardware, such as a firewall, a load balance device, a switch, a router, and a network management system. Large quantities of complex special-purpose hardware devices cause problems such as strong coupling between software and hardware, high maintenance costs, and inefficient service deployment, and it is more difficult to find deployment space and supply power for the special-purpose hardware. In addition, with diversity and rapid creative development of services, a lifespan of a special-purpose device based on hardware expires rather fast. In this case, operators need to continuously perform "design-integration-deployment". Consequently, costs are increasing while profits become smaller, which poses a great challenge for operators. In this background, an operator alliance proposes a concept of network functions virtualization (NFV). By means of an IT virtualization technology, network functions of devices such as a router, a switch, a firewall, and a network storage device are implemented by software on a standard IT server, to implement standardization and simplification of a hardware device on the communications network, and reduce costs and implement fast service deployment and innovation. However, in many scenarios, it is hard for the software running on the standard IT server to meet performance and delay requirements of the communications network in many scenarios. Therefore, a hardware acceleration device is required to perform service acceleration.

In addition to an acceleration requirement in an NFV scenario, there are already many existing hardware acceleration devices in the industry, such as a graphics accelerator card, an encryption/decryption accelerator card, an encoding/decoding accelerator card, and another service accelerator chip. This type of hardware acceleration device is connected to a service processing unit by means of a plug-in card, or a special-purpose accelerator chip is connected to a service processing unit by means of PCB routing, and the service processing unit uses an accelerator resource exclusively. Alternatively, an accelerator is connected to a service processing unit by using a network, implementing a manner in which service processing units use an accelerator resource at different times.

As shown in FIG. 1, a method and an information processing system for dynamically managing an accelerator resource are provided in the prior art. After completing system initialization, the system initially designates a set of accelerator resources for service processing units in one-to-one correspondence. For example, the system initially designates an accelerator resource A for a service processing unit A, designates an accelerator resource B for a service processing unit B, and designates an accelerator resource C for a service processing unit C. An allocation manager is responsible for monitoring performance statistical information of services running on all service processing units. When a service processing unit A cannot achieve a working performance objective, the allocation manager analyzes a workload stratus of another service processing unit. After an accelerator resource corresponding to a service processing unit C is redesignated for the service processing unit A that cannot achieve the working performance objective, if a performance degradation value of the service processing unit C is greater than a performance enhancement value of the service processing unit A, or a performance enhancement value of the service processing unit A is greater than a specified threshold, the accelerator resource corresponding to the service processing unit C is allocated to the service processing unit A. In this case, the service processing unit C will lose the accelerator resource.

In the prior art, the system allocation manager collects working statuses of all the service processing units, and dynamically allocates a binding relationship between an accelerator resource and a service processing unit, which improves utilization of accelerator resources to some extent. However, at any time point, an accelerator resource can be used only by one service processing unit, which increases an accelerator resource of one service processing unit, improves working performance of the service processing unit, and degrades working performance of another service processing unit. Therefore, the accelerator resources cannot be utilized properly, resulting in a problem of resource waste.

SUMMARY

Embodiments of the present invention provide a service acceleration method and apparatus. The method and the apparatus that are provided in the embodiments of the present invention resolve a prior-art problem of resource waste caused by inappropriate utilization of accelerator resources.

According to a first aspect, a service acceleration apparatus is provided, where the apparatus is connected to multiple service processing units and multiple acceleration engines, and the apparatus includes:

a resource pool forming module, configured to: query acceleration type information and information about an idle acceleration ability that are of the multiple acceleration engines, and form an accelerator resource pool according to the acceleration type information and the information about the idle acceleration ability;

a determining module, configured to: after receiving an acceleration application of a first service processing unit in the multiple service processing units, determine, according to the acceleration application, a first acceleration ability and a first acceleration type that are requested by the first service processing unit; and determine whether a first quantity is greater than a second quantity, where the first quantity indicates an idle acceleration ability, in the accelerator resource pool, corresponding to the first acceleration type, and the second quantity indicates the required first acceleration ability;

an acceleration ability allocation module, configured to: when the first quantity is greater than the second quantity, allocate, from the accelerator resource pool according to a preset allocation granularity, a first idle acceleration ability and a connection number that are corresponding to the first acceleration ability and the first acceleration type, where the allocation granularity is a smallest allocation unit used for pre-allocating an idle acceleration ability in the accelerator resource pool;

a connection establishment module, configured to send the connection number to the first service processing unit, so that the first service processing unit establishes a connection to the service acceleration apparatus according to the connection number; and a forwarding module, configured to: send, to at least one acceleration engine of the multiple acceleration engines that provides the idle acceleration ability, a to-be-accelerated packet that is received by using the connection, for acceleration processing; and feed back a result packet that is obtained after acceleration processing to the first service processing unit.

With reference to the first aspect, in a first possible implementation manner, the apparatus further includes:

an indication information adding module, configured to: when it is determined that the acceleration application requests to perform acceleration processing of multiple acceleration types on the to-be-accelerated packet, determine, from the multiple acceleration engines, multiple target acceleration engines corresponding to the multiple acceleration types, generate routing information according to identifier information of the multiple target acceleration engines, and add the routing information to the to-be-accelerated packet, so that an acceleration engine that receives the to-be-accelerated packet forwards, according to the routing information, the to-be-accelerated packet to a target acceleration engine indicated by the routing information, for acceleration processing.

With reference to the first aspect or the first possible implementation manner of the first aspect, in a second possible implementation manner, the forwarding module is further configured to: add a sequence number identifying each to-be-accelerated packet to the to-be-accelerated packet; after receiving the result packet that is obtained after acceleration processing, according to whether the sequence numbers are consecutive, determine whether the acceleration processing performed on the to-be-accelerated packet is abnormal; and if the acceleration processing is abnormal, send a retransmission indication to the first service processing unit.

With reference to any one of the first aspect, or the first to the second possible implementation manners of the first aspect, in a third possible implementation manner, when the connection established between the first service processing unit and the service acceleration apparatus is a remote direct memory access RDMA connection, the forwarding module is further configured to: after receiving the to-be-accelerated packet, obtain a storage address carried in the to-be-accelerated packet, where the storage address is corresponding to a first storage area in the first service processing unit; and correspondingly, when feeding back the result packet that is obtained after acceleration processing to the first service processing unit, write the result packet into the first storage area in an RDMA manner.

With reference to any one of the first aspect, or the first to the third possible implementation manners of the first aspect, in a fourth possible implementation manner, the apparatus further includes:

a restoration module, configured to: delete the connection between the first service processing unit and the service acceleration apparatus after receiving an acceleration resource release request sent by the first service processing unit; and update the accelerator resource pool after the first idle acceleration ability is released.

According to a second aspect, a service acceleration method is provided, where the method is applied to a service acceleration apparatus, and the apparatus is connected to multiple service processing units and multiple acceleration engines; and the method includes:

querying acceleration type information and information about an idle acceleration ability that are of the multiple acceleration engines, and forming an accelerator resource pool according to the acceleration type information and the information about the idle acceleration ability;

after receiving an acceleration application of a first service processing unit in the multiple service processing units, determining, according to the acceleration application, a first acceleration ability and a first acceleration type that are requested by the first service processing unit; and determining whether a first quantity is greater than a second quantity, where the first quantity indicates an idle acceleration ability, in the accelerator resource pool, corresponding to the first acceleration type, and the second quantity indicates the required first acceleration ability;

when the first quantity is greater than the second quantity, allocating, from the accelerator resource pool according to a preset allocation granularity, a first idle acceleration ability and a connection number that are corresponding to the first acceleration ability and the first acceleration type, where the allocation granularity is a smallest allocation unit used for pre-allocating an idle acceleration ability in the accelerator resource pool;

sending the connection number to the first service processing unit, so that the first service processing unit establishes a connection to the service acceleration apparatus according to the connection number; and sending, to at least one acceleration engine of the multiple acceleration engines that provides the idle acceleration ability, a to-be-accelerated packet that is received by using the connection, for acceleration processing; and feeding back a result packet that is obtained after acceleration processing to the first service processing unit.

With reference to the second aspect, in a first possible implementation manner, before the sending, to at least one acceleration engine of the multiple acceleration engines that provides the idle acceleration ability, a to-be-accelerated packet that is received by using the connection, for acceleration processing, the method further includes:

when it is determined that the acceleration application requests to perform acceleration processing of multiple acceleration types on the to-be-accelerated packet, determining, from the multiple acceleration engines, multiple target acceleration engines corresponding to the multiple acceleration types, generating routing information according to identifier information of the multiple target acceleration engines, and adding the routing information to the to-be-accelerated packet, so that an acceleration engine that receives the to-be-accelerated packet forwards, according to the routing information, the to-be-accelerated packet to a target acceleration engine indicated by the routing information, for acceleration processing.

With reference to the second aspect or the first possible implementation manner of the second aspect, in a second possible implementation manner, before the sending, to at least one acceleration engine of the multiple acceleration engines that provides the idle acceleration ability, a to-be-accelerated packet that is received by using the connection, for acceleration processing, the method further includes:

adding a sequence number identifying each to-be-accelerated packet to the to-be-accelerated packet; and correspondingly, after receiving the result packet that is obtained after acceleration processing, according to whether the sequence numbers are consecutive, determining whether the acceleration processing performed on the to-be-accelerated packet is abnormal; and if the acceleration processing is abnormal, sending a retransmission indication to the first service processing unit.

With reference to any one of the second aspect, or the first to the second possible implementation manners of the second aspect, in a third possible implementation manner, when the connection established between the first service processing unit and the service acceleration apparatus is an RDMA connection, before the sending, to at least one acceleration engine of the multiple acceleration engines that provides the idle acceleration ability, a to-be-accelerated packet that is received by using the connection, for acceleration processing, the method further includes:

after receiving the to-be-accelerated packet, obtaining a storage address carried in the to-be-accelerated packet, where the storage address is corresponding to a first storage area in the first service processing unit; and correspondingly, the feeding back a result packet that is obtained after acceleration processing to the first service processing unit includes:

writing the result packet into the first storage area in an RDMA manner.

With reference to any one of the second aspect, or the first to the third possible implementation manners of the second aspect, in a fourth possible implementation manner, after the feeding back a result packet that is obtained after acceleration processing to the first service processing unit, the method further includes:

deleting the connection between the first service processing unit and the service acceleration apparatus after receiving an acceleration resource release request sent by the first service processing unit; and updating the accelerator resource pool after the first idle acceleration ability is released.

One or two of the foregoing technical solutions have at least the following technical effects:

According to the method and the apparatus that are provided in embodiments of the present invention, acceleration resources provided by multiple acceleration engines are integrated into an accelerator resource pool, the acceleration resources in the accelerator resource pool are managed together, and an acceleration resource is quantitatively allocated from the accelerator resource pool to each service processing unit that applies for service acceleration. In the embodiments of the present invention, an acceleration engine and a service processing unit are connected by using a network, and a link connection relationship is established between a service processing unit and the accelerator resource pool in real time according to a requirement of the service processing unit. When connection establishment is applied for, the service processing unit applies to the accelerator resource pool for a quantitative acceleration ability. The apparatus provided in the present invention completes quantitative allocation for acceleration abilities in the accelerator resource pool by means of traffic control, and a service processing unit releases a connection between the service processing unit and an accelerator after acceleration is complete, so that all service processing units fully share the accelerator resources.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The service acceleration apparatus provided in the embodiments of the present invention integrates acceleration resources provided by multiple acceleration engines into an accelerator resource pool, manages the acceleration resources in the accelerator resource pool together, and quantitatively allocates an acceleration resource from the accelerator resource pool to each service processing unit that applies for service acceleration. In the embodiments of the present invention, an acceleration engine and a service processing unit are connected by using a network, and a link connection relationship is established between a service processing unit and the accelerator resource pool in real time according to a requirement of the service processing unit. When connection establishment is applied for, the service processing unit quantitatively applies to the accelerator resource pool for an acceleration ability. The apparatus provided in the present invention completes quantitative allocation for acceleration abilities in the accelerator resource pool by means of traffic control, and a service processing unit releases a connection between the service processing unit and an accelerator after acceleration is complete, so that all service processing units fully share the accelerator resources.

The following further details the embodiments of the present invention with reference to the accompanying drawings of the specification.

Figure 1:
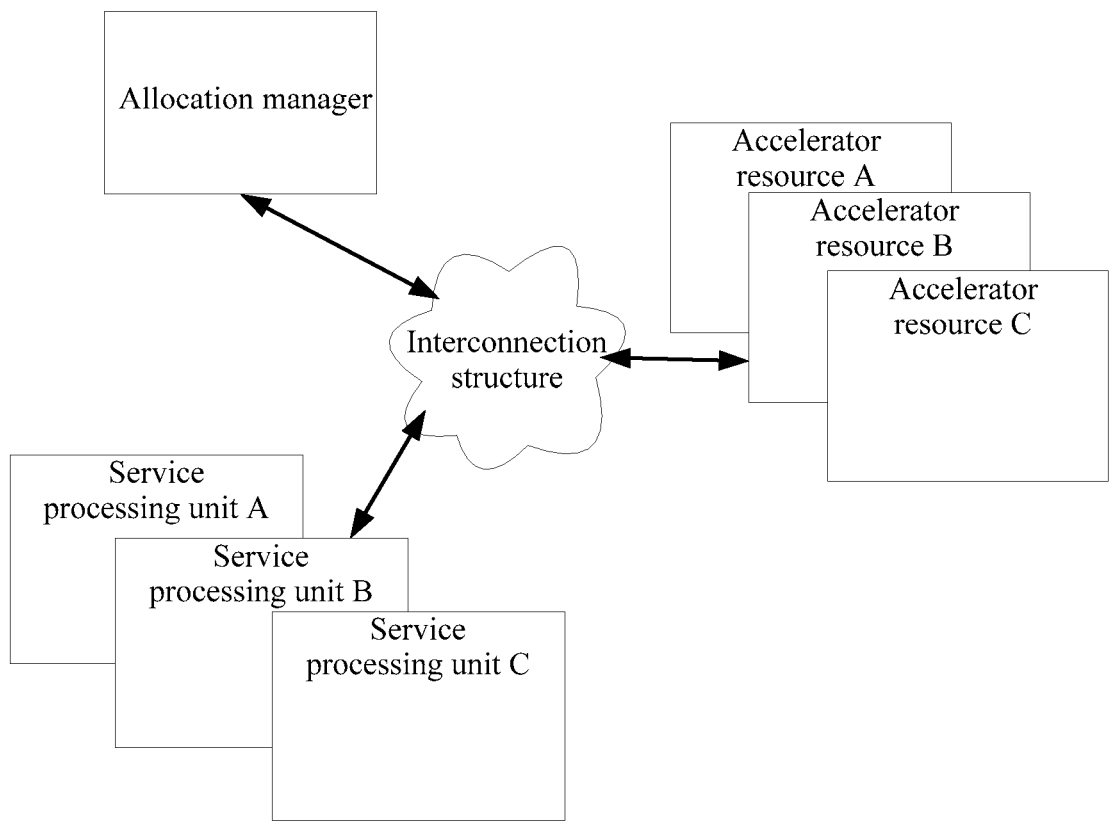
FIG. 1 is a schematic structural diagram of a service acceleration system for dynamically allocating an accelerator resource in the prior art.
Figure 2:
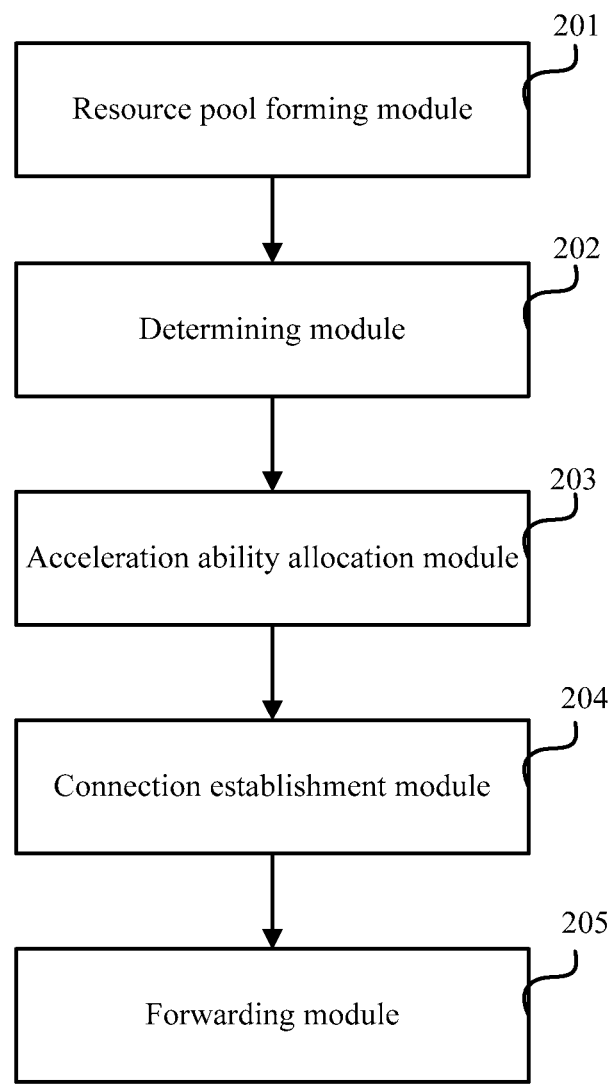
FIG. 2 is a schematic structural diagram of a service acceleration apparatus according to an embodiment of the present invention.

As shown in FIG. 2, an embodiment of the present invention provides a service acceleration apparatus. The apparatus is connected to multiple service processing units and multiple acceleration engines, and the apparatus includes: a resource pool forming module 201, a determining module 202, an acceleration ability allocation module 203, a connection establishment module 204, and a forwarding module 205.

The service acceleration apparatus provided in this embodiment of the present invention and the multiple acceleration engines may be disposed on a same hardware device. Alternatively, the service acceleration apparatus and the multiple acceleration engines are disposed on different hardware devices. A hardware device on which the service acceleration apparatus is disposed and a hardware device on which an acceleration engine is disposed may be connected in a specific connection manner. When the service acceleration apparatus needs to use one or more acceleration engines, the service acceleration apparatus may be connected to the one or more acceleration engines that need to be used, and then call the one or more acceleration engines.

The resource pool forming module 201 is configured to: query acceleration type information and information about an idle acceleration ability that are of the multiple acceleration engines, and form an accelerator resource pool according to the acceleration type information and the information about the idle acceleration ability.

In this embodiment of the present invention, because an accelerator resource pool is composed of multiple acceleration engines, different acceleration engines may be corresponding to different types (A type of an acceleration engine in this embodiment refers to a type of acceleration processing performed by the acceleration engine on a data packet. For example, if an acceleration engine performs encoding acceleration processing, a type of the acceleration engine is an encoding acceleration type). Therefore, in the accelerator resource pool, acceleration resources may be classified, and acceleration resources provided by a same type of acceleration engine are gathered together. For example, if there are three acceleration engines of an encoding type, in the accelerator resource pool, counted encoding acceleration resources are a sum of all idle acceleration abilities of these acceleration engines.

The determining module 202 is configured to: after receiving an acceleration application of a first service processing unit in the multiple service processing units, determine, according to the acceleration application, a first acceleration ability and a first acceleration type that are requested by the first service processing unit; and determine whether a first quantity is greater than a second quantity, where the first quantity indicates an idle acceleration ability, in the accelerator resource pool, corresponding to the first acceleration type, and the second quantity indicates the required first acceleration ability.

In the prior art, each service processing unit is corresponding to an independent acceleration engine. If a single acceleration engine in a system cannot meet a requirement of a service processing unit, the acceleration engine cannot respond to application of the service processing unit. However, in the solutions provided in this embodiment of the present invention, all acceleration engines are integrated into a resource pool, and if integrated idle resources of several acceleration engines of a same type can meet a requirement of a service processing unit, the several acceleration engines can respond to application of the service processing unit.

The acceleration ability allocation module 203 is configured to: when the first quantity is greater than the second quantity, allocate, from the accelerator resource pool according to a preset allocation granularity, a first idle acceleration ability and a connection number that are corresponding to the first acceleration ability and the first acceleration type, where the allocation granularity is a smallest allocation unit used for pre-allocating an idle acceleration ability in the accelerator resource pool.

In this embodiment of the present invention, for an actual acceleration engine, the allocation granularity is corresponding to an acceleration type. For example, if an acceleration ability corresponding to an acceleration engine 1 is a two-channel H265 encoding/decoding acceleration processing ability, a corresponding allocation granularity may be a one-channel H265 encoding/decoding acceleration processing ability. The allocation granularity may be a default value or a system configuration value. An allocation granularity of another acceleration type may be: a one-channel video encoding/decoding ability, a 1-Gbps compression/decompression ability, a 1-Gbps encryption/decryption processing ability, or the like.

The connection establishment module 204 is configured to send the connection number to the first service processing unit, so that the first service processing unit establishes a connection to the service acceleration apparatus according to the connection number.

The forwarding module 205 is configured to: send, to at least one acceleration engine of the multiple acceleration engines that provides the idle acceleration ability, a to-be-accelerated packet that is received by using the connection, for acceleration processing; and feed back a result packet that is obtained after acceleration processing to the first service processing unit.

An acceleration resource that is obtained by a service processing unit by means of application may be formed by integrating idle resources of multiple acceleration engines. Therefore, after the to-be-accelerated packet sent by the service processing unit is received, the to-be-accelerated packet may be sent to a corresponding acceleration engine according to a correspondence between an acceleration ability that is obtained by means of application and an acceleration engine, for processing. In this case, the forwarding module 205 is further configured to: add a sequence number identifying each to-be-accelerated packet to the to-be-accelerated packet; after receiving the result packet that is obtained after acceleration processing, according to whether the sequence numbers are consecutive, determine whether the acceleration processing performed on the to-be-accelerated packet is abnormal; and if the acceleration processing is abnormal, send a retransmission indication to the first service processing unit.

In this embodiment of the present invention, to ensure that each acceleration engine can perform processing in time after receiving a to-be-accelerated packet, the apparatus performs quality of service (Quality of Service, QoS) control on each flow according to information about an acceleration ability allocated to a service processing unit, and discards a packet exceeding an acceleration ability that is applied for when the service processing unit establishes a connection. In addition, the apparatus returns NAK information to the service processing unit, where the NAK information is used to notify the service processing unit that an accelerator is congested, and instruct the service processing unit to retransmit the packet after waiting for a period of time. That is, it is indicated that a corresponding service flow of the service acceleration apparatus exceeds a traffic threshold, and the service processing unit retransmits, according to the indication, the to-be-accelerated packet after QoS is met.

In addition, to implement real-time sharing of an acceleration resource and reduce an idle status and waste of the accelerator resource, the apparatus provided in this embodiment of the present invention releases a corresponding acceleration resource after completing an acceleration task applied for by each service processing unit. The apparatus further includes:

a restoration module, configured to: delete the connection between the first service processing unit and the service acceleration apparatus after receiving an acceleration resource release request sent by the first service processing unit; and update the accelerator resource pool after the first idle acceleration ability is released.

In this embodiment of the present invention, the service acceleration apparatus only completes service acceleration processing for a packet and does not need to cache the packet. In addition, the service acceleration apparatus has completed resource allocation at a stage that a service processing unit initiates a connection establishment request to apply for an acceleration resource. The service acceleration apparatus controls packet traffic between a service processing unit and an acceleration engine. In this way, all packets that enter the acceleration engine can be processed by the acceleration engine in time, and then processed packets are returned to the service processing unit. Therefore, the service acceleration apparatus does not need to first transmit an address to the service processing unit. If there is a remote direct memory access (RDMA) connection between the service acceleration apparatus and the service processing unit, the service processing unit does not need to obtain the cache address from the service acceleration apparatus according to a standard RDMA protocol, and a storage address in a packet fed back by the service acceleration apparatus may be alternatively applied for by the service processing unit before the packet is sent, so as to avoid subsequently obtaining address information by means of multiple interactions. When the connection established between the first service processing unit and the service acceleration apparatus is an RDMA connection, in the apparatus, the forwarding module 205 is further configured to: after receiving the to-be-accelerated packet, obtain a storage address carried in the to-be-accelerated packet, where the storage address is corresponding to a first storage area in the first service processing unit; and correspondingly, when feeding back the result packet that is obtained after acceleration processing to the first service processing unit, write the result packet into the first storage area in an RDMA manner.

In this embodiment of the present invention, for a service that requires multiple types of acceleration, to implement that a to-be-accelerated packet is transmitted to the accelerator resource pool one time, in the solutions provided in this embodiment of the present invention, acceleration routing information may be added to a packet header of the to-be-accelerated packet, so that the packet is directly and successively transmitted between various acceleration engines to complete acceleration processing of various types, and then a result packet is returned to a service processing unit, which prevents the packet from being transmitted multiple times between the service processing unit and the accelerator resource pool. Correspondingly, the apparatus further includes:

an indication information adding module, configured to: when it is determined that the acceleration application requests to perform acceleration processing of multiple acceleration types on the to-be-accelerated packet, determine, from the multiple acceleration engines, multiple target acceleration engines corresponding to the multiple acceleration types, generate routing information according to identifier information of the multiple target acceleration engines, and add the routing information to the to-be-accelerated packet, so that an acceleration engine that receives the to-be-accelerated packet forwards, according to the routing information, the to-be-accelerated packet to a target acceleration engine indicated by the routing information, for acceleration processing.

All acceleration engines connected to the service acceleration apparatus provided in this embodiment of the present invention may be allocated, as required, to multiple users for sharing at the same time, which implements virtualization and quantitative allocation of an accelerator resource. In addition, each service processing unit applies to an accelerator for an acceleration resource in real time as required, releases the acceleration resource after service acceleration processing is complete, and performs traffic control, according to an application volume, on a to-be-accelerated service sent by the service processing unit. Therefore, real-time sharing of an acceleration resource is implemented, and an idle status and waste of the accelerator resource are reduced.

If there is an RDMA connection between the service processing unit and the service acceleration apparatus, an interaction process of the RDMA protocol is further simplified based on a characteristic of service processing between the service processing unit and the service acceleration apparatus in the present invention, which reduces a packet transmission delay between the service processing unit and the service acceleration apparatus, reduces CPU load of the service processing unit, and improves system performance.

Further, if acceleration needs to be performed multiple times on a to-be-accelerated packet, routing information may be added to the to-be-accelerated packet, to forward the packet between multiple acceleration engines by using the routing information, so that the service packet on which acceleration needs to be performed multiple times needs neither to be transmitted multiple times between a service processing unit and an accelerator, nor to be forwarded multiple times by using an accelerator management module inside the accelerator, which reduces a delay caused by multiple times of service acceleration processing, and improves system performance.

Figure 3:
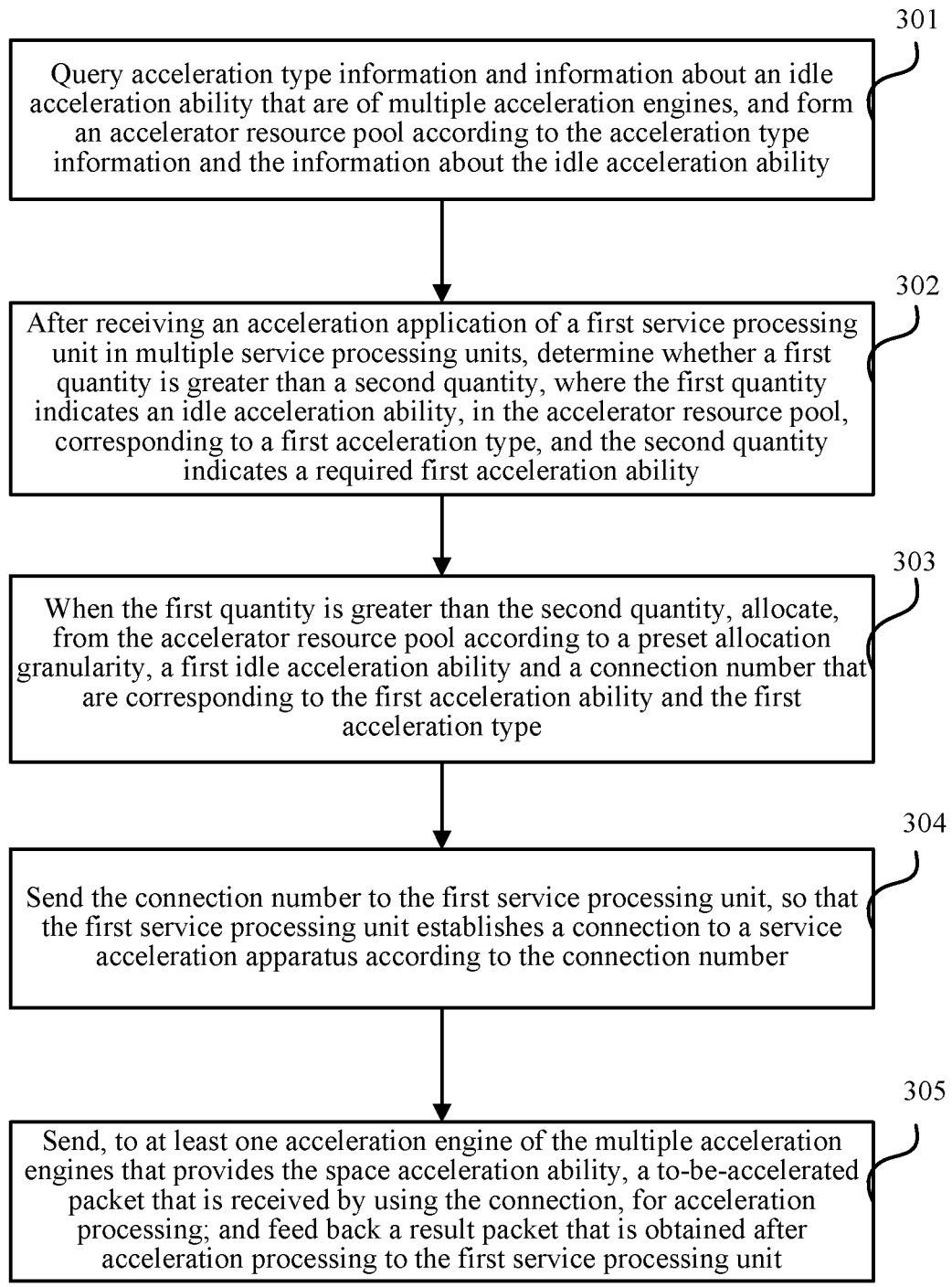
FIG. 3 is a schematic flowchart of a service acceleration method according to an embodiment of the present invention.

As shown in FIG. 3, an embodiment of the present invention further provides a service acceleration method, where the method is applied to a service acceleration apparatus, and the apparatus is connected to multiple service processing units and multiple acceleration engines. The method includes the following steps.

Step 301: Query acceleration type information and information about an idle acceleration ability that are of the multiple acceleration engines, and form an accelerator resource pool according to the acceleration type information and the information about the idle acceleration ability.

In this embodiment of the present invention, because an accelerator resource pool is composed of multiple acceleration engines, different acceleration engines may be corresponding to different types (A type of an acceleration engine in this embodiment refers to a type of acceleration processing performed by the acceleration engine on a data packet. For example, if an acceleration engine performs encoding acceleration processing, a type of the acceleration engine is an encoding acceleration type). Therefore, in the accelerator resource pool, acceleration resources may be classified, and acceleration resources provided by a same type of acceleration engine are gathered together. For example, if there are three acceleration engines of an encoding type, in the accelerator resource pool, counted encoding acceleration resources are a sum of all idle acceleration abilities of these acceleration engines. In this embodiment, acceleration abilities and acceleration types of the acceleration engines may be counted in a tabular form, as shown in Table 1.

TABLE 1

| Acceleration engine number | Acceleration ability type | Acceleration ability | Allocation granularity | Idle acceleration ability |
|---|---|---|---|---|
| AE 1 | Type 1 | Ability 1 | Cfg 1 | Ability 1' |
| AE 2 | Type 2 | Ability 2 | Cfg 2 | Ability 2' |
| AE 3 | Type 3 | Ability 3 | Cfg 3 | Ability 3' |
| AE 4 | Type 4 | Ability 4 | Cfg 4 | Ability 4' |
| ... | ... | ... | ... | ... |
| AE n | Type n | Ability n | Cfg n | Ability n' |

Table 1 is formed according to obtained acceleration ability information and acceleration type information that are of the acceleration engines, where each row represents a current state of an acceleration engine. For example, the first row is corresponding to an acceleration engine 1 (an acceleration engine number is AE 1). In the first row, an acceleration type is Type 1 (which may be specifically encoding, decoding, compression, decompression, and the like); an acceleration ability (Ability 1) refers to a total acceleration ability of AE 1; an allocation granularity (Cfg 1) refers to a smallest resource allocation unit corresponding to an acceleration type based on an acceleration engine (for example, a one-channel H262 decoding acceleration processing ability, or an encryption/decryption processing ability that needs 2 Gbps); and an idle acceleration ability refers to an acceleration ability when an acceleration engine is currently idle, and if the value is 0, it indicates that the acceleration engine is in a busy state.

Step 302: After receiving an acceleration application of a first service processing unit in the multiple service processing units, determine, according to the acceleration application, a first acceleration ability and a first acceleration type that are requested by the first service processing unit; and determine whether a first quantity is greater than a second quantity, where the first quantity indicates an idle acceleration ability, in the accelerator resource pool, corresponding to the first acceleration type, and the second quantity indicates the required first acceleration ability.

In the prior art, each service processing unit is corresponding to an independent acceleration engine. If a single acceleration engine in a system cannot meet a requirement of a service processing unit, the acceleration engine cannot respond to application of the service processing unit. However, in the solutions provided in this embodiment of the present invention, all acceleration engines are integrated into a resource pool, and if integrated idle resources of several acceleration engines of a same type can meet a requirement of a service processing unit, the several acceleration engines can respond to application of the service processing unit.

Step 303: When the first quantity is greater than the second quantity, allocate, from the accelerator resource pool according to a preset allocation granularity, a first idle acceleration ability and a connection number that are corresponding to the first acceleration ability and the first acceleration type, where the allocation granularity is a smallest allocation unit used for pre-allocating an idle acceleration ability in the accelerator resource pool.

In this embodiment of the present invention, for an actual acceleration engine, the allocation granularity is corresponding to an acceleration type. For example, if an acceleration ability corresponding to an acceleration engine 1 is a two-channel H265 encoding/decoding acceleration processing ability, a corresponding allocation granularity may be a one-channel H265 encoding/decoding acceleration processing ability. The allocation granularity may be a default value or a system configuration value. An allocation granularity of another acceleration type may be: a one-channel video encoding/decoding ability, a 1-Gbps compression/decompression ability, a 1-Gbps encryption/decryption processing ability, or the like.

Step 304: Send the connection number to the first service processing unit, so that the first service processing unit establishes a connection to the service acceleration apparatus according to the connection number.

After acceleration resources are allocated, content in Table 1 may be further refreshed, which facilitates acceleration resource application by another service processing unit. If the first service processing unit completes application for idle acceleration abilities of an acceleration engine 2 and an acceleration engine 3, the idle acceleration abilities of the acceleration engine 2 (an identifier AE 2) and the acceleration engine 3 (an identifier AE 3) may be marked as 0. Specific parameters are shown in Table 2.

TABLE 2

| Acceleration engine number | Acceleration ability type | Acceleration ability | Allocation granularity | Idle acceleration ability |
|---|---|---|---|---|
| AE 1 | Type 1 | Ability 1 | Cfg 1 | Ability 1' |
| AE 2 | Type 2 | Ability 2 | Cfg 2 | 0 |
| AE 3 | Type 3 | Ability 3 | Cfg 3 | 0 |
| AE 4 | Type 4 | Ability 4 | Cfg 4 | Ability 4' |
| ... | ... | ... | ... | ... |
| AE n | Type n | Ability n | Cfg n | Ability n' |

Step 305: Send, to at least one acceleration engine of the multiple acceleration engines that provides the idle acceleration ability, a to-be-accelerated packet that is received by using the connection, for acceleration processing; and feed back a result packet that is obtained after acceleration processing to the first service processing unit.

An acceleration resource that is obtained by a service processing unit by means of application may be formed by integrating idle resources of multiple acceleration engines. Therefore, after the to-be-accelerated packet sent by the service processing unit is received, the to-be-accelerated packet may be sent to a corresponding acceleration engine according to a correspondence between an acceleration ability that is obtained by means of application and an acceleration engine, for processing. Therefore, in the method provided in this embodiment of the present invention, before the sending, to at least one acceleration engine of the multiple acceleration engines that provides the idle acceleration ability, a to-be-accelerated packet that is received by using the connection, for acceleration processing, the method further includes:

adding a sequence number identifying each to-be-accelerated packet to the to-be-accelerated packet; and correspondingly, after receiving the result packet that is obtained after acceleration processing, according to whether the sequence numbers are consecutive, determining whether the acceleration processing performed on the to-be-accelerated packet is abnormal; and if the acceleration processing is abnormal, sending a retransmission indication to the first service processing unit.

In a specific embodiment, serial numbers and packet sequence numbers need to be further marked for packets of a same service processing unit, and during packet forwarding, a target AE to which a packet is to be sent is identified. Serial numbers AE 11 and AE 12 represent a packet 1 and a packet 2 that need to be sent to AE 1 for acceleration processing, and serial numbers AE 33 and AE 34 represent that a packet needs to be sent to AE 3 for processing. In addition, to implement real-time sharing of an acceleration resource and reduce an idle status and waste of the accelerator resource, the apparatus provided in this embodiment of the present invention releases a corresponding acceleration resource after completing an acceleration task applied for by each service processing unit. In this embodiment, after the feeding back a result packet that is obtained after acceleration processing to the first service processing unit, the method further includes:

deleting the connection between the first service processing unit and the service acceleration apparatus after receiving an acceleration resource release request sent by the first service processing unit; and updating the accelerator resource pool after the first idle acceleration ability is released.

In this embodiment of the present invention, for a service that requires multiple types of acceleration, to implement that a to-be-accelerated packet is transmitted to the accelerator resource pool one time, in the solutions provided in this embodiment of the present invention, acceleration routing information may be added to a packet header of the to-be-accelerated packet, so that the packet is directly and successively transmitted between various acceleration engines to complete acceleration processing of various types, and then a result packet is returned to a service processing unit, which prevents the packet from being transmitted multiple times between the service processing unit and the accelerator resource pool. Correspondingly, before the sending, to at least one acceleration engine of the multiple acceleration engines that provides the idle acceleration ability, a to-be-accelerated packet that is received by using the connection, for acceleration processing, the method further includes:

when it is determined that the acceleration application requests to perform acceleration processing of multiple acceleration types on the to-be-accelerated packet, determining, from the multiple acceleration engines, multiple target acceleration engines corresponding to the multiple acceleration types, generating routing information according to identifier information of the multiple target acceleration engines, and adding the routing information to the to-be-accelerated packet, so that an acceleration engine that receives the to-be-accelerated packet forwards, according to the routing information, the to-be-accelerated packet to a target acceleration engine indicated by the routing information, for acceleration processing.

In this embodiment of the present invention, the service acceleration apparatus only completes service acceleration processing for a packet and does not need to cache the packet. In addition, the service acceleration apparatus has completed resource allocation at a stage that a service processing unit initiates a connection establishment request to apply for an acceleration resource. The service acceleration apparatus controls packet traffic between a service processing unit and an acceleration engine. In this way, all packets that enter the acceleration engine can be processed by the acceleration engine in time, and then processed packets are returned to the service processing unit. Therefore, the service acceleration apparatus does not need to first transmit an address to the service processing unit. If there is a remote direct memory access (Remote direct memory access, RDMA) connection between the service acceleration apparatus and the service processing unit, the service processing unit does not need to obtain the cache address from the service acceleration apparatus according to a standard RDMA protocol, and a storage address in a packet fed back by the service acceleration apparatus may be alternatively applied for by the service processing unit before the packet is sent, so as to avoid subsequently obtaining address information by means of multiple interactions. When the connection established between the first service processing unit and the service acceleration apparatus is an RDMA connection, before the sending, to at least one acceleration engine of the multiple acceleration engines that provides the idle acceleration ability, a to-be-accelerated packet that is received by using the connection, for acceleration processing, the method further includes:

after receiving the to-be-accelerated packet, obtaining a storage address carried in the to-be-accelerated packet, where the storage address is corresponding to a first storage area in the first service processing unit; and correspondingly, the feeding back a result packet that is obtained after acceleration processing to the first service processing unit includes:

writing the result packet into the first storage area in an RDMA manner.

Figure 4:
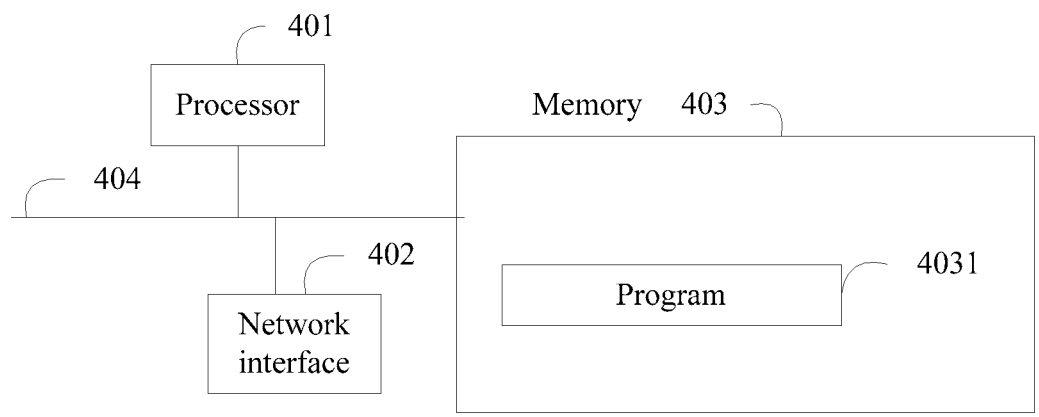
FIG. 4 is a schematic structural diagram of an acceleration management apparatus according to an embodiment of the present invention.

As shown in FIG. 4, the present invention further provides another acceleration management apparatus, where the acceleration management apparatus is connected to multiple service processing units and multiple acceleration engines. The apparatus includes at least one processor 401 (for example, a CPU), at least one network interface 402 or another communications interface, a memory 403, and at least one communications bus 404, which is configured to implement connection and communication between these components. The processor 401 is configured to execute an executable module stored in the memory 403, such as a computer program. The memory 403 may include a high-speed random access memory (RAM: random access memory), and may also include a non-volatile memory (non-volatile memory), for example, at least one disk memory. At least one network interface 402 (which may be wired or wireless) is used to implement a communication connection between the system and at least one another network element, and the internet, a wide area network, a local area network, a metropolitan area network, or the like may be used. A file system is disposed in the server, where the file system is configured to manage a directory and a file. Each directory is corresponding to a directory storage object, the directory storage object includes a file included in a corresponding directory or an attribute list of a directory, and the attribute list includes a name and attribute information of the file or the directory.

In some implementation manners, the memory stores a program 4031, where the program may be executed by the processor and includes:

querying acceleration type information and information about an idle acceleration ability that are of the multiple acceleration engines, and forming an accelerator resource pool according to the acceleration type information and the information about the idle acceleration ability;

after receiving an acceleration application of a first service processing unit in the multiple service processing units, determining, according to the acceleration application, a first acceleration ability and a first acceleration type that are requested by the first service processing unit; and determining whether a first quantity is greater than a second quantity, where the first quantity indicates an idle acceleration ability, in the accelerator resource pool, corresponding to the first acceleration type, and the second quantity indicates the required first acceleration ability;

when the first quantity is greater than the second quantity, allocating, from the accelerator resource pool according to a preset allocation granularity, a first idle acceleration ability and a connection number that are corresponding to the first acceleration ability and the first acceleration type, where the allocation granularity is a smallest allocation unit used for pre-allocating an idle acceleration ability in the accelerator resource pool;

sending the connection number to the first service processing unit, so that the first service processing unit establishes a connection to the service acceleration apparatus according to the connection number; and sending, to at least one acceleration engine of the multiple acceleration engines that provides the idle acceleration ability, a to-be-accelerated packet that is received by using the connection, for acceleration processing; and feeding back a result packet that is obtained after acceleration processing to the first service processing unit.

Figure 5:
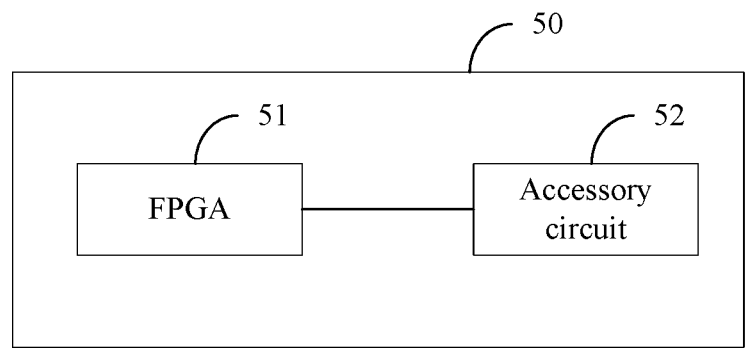
FIG. 5 is a schematic structural diagram of another acceleration management apparatus according to an embodiment of the present invention.

In another embodiment, the acceleration management apparatus may be alternatively implemented based on an FPGA. Referring to FIG. 5, FIG. 5 is a schematic diagram of implementing, based on the FPGA, an acceleration management apparatus 50. The acceleration management apparatus 50 includes an FPGA chip 51 and another accessory circuit 52 (for example, a power supply circuit). Programming is performed on the FPGA chip, so that the FPGA chip has functions mentioned in the foregoing embodiments (for example, the FPGA chip has functions of executing the method shown in FIG. 3).

Figure 6:
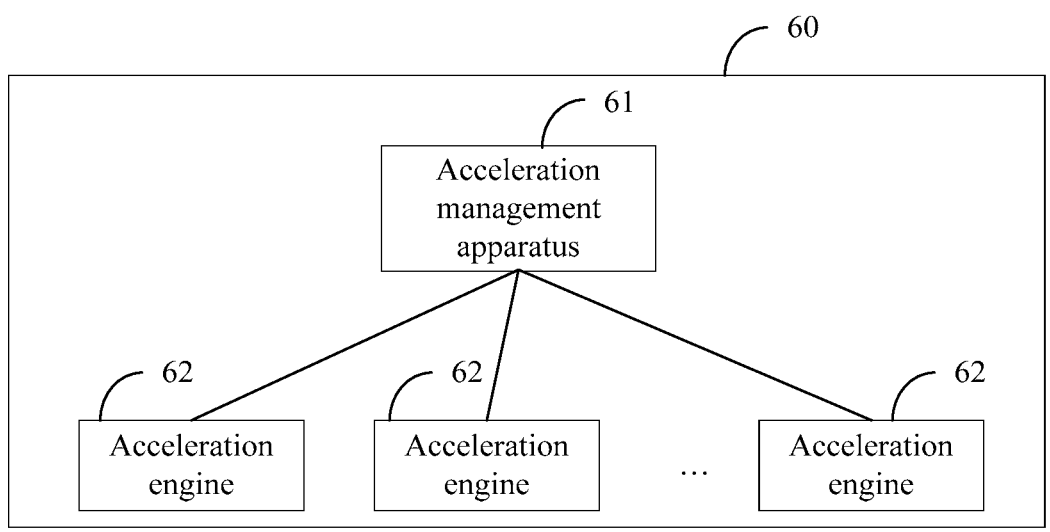
FIG. 6 is a schematic architecture diagram of an acceleration system according to an embodiment of the present invention.

Referring to FIG. 6, an embodiment of the present invention discloses an acceleration system 60, including an acceleration management apparatus 61 and multiple acceleration engines 62. The acceleration management apparatus 61 may be implemented based on manners in FIG. 4 and FIG. 5, and the acceleration engines 62 are preferably implemented based on an FPGA chip. Compared with a general-purpose CPU chip, the FPGA chip can increase a processing speed, so as to perform service acceleration better. For interactions between the acceleration management apparatus 61 and the acceleration engines 62, reference may be made to descriptions in the foregoing embodiments, and details are not described herein.

One or more of the foregoing technical solutions in the embodiments of this application have at least the following technical effects:

All acceleration engines connected to the service acceleration apparatus provided in this embodiment of the present invention may be allocated, as required, to multiple users for sharing at the same time, which implements virtualization and quantitative allocation of an accelerator resource. In addition, each service processing unit applies to an accelerator for an acceleration resource in real time as required, releases the acceleration resource after service acceleration processing is complete, and performs traffic control, according to an application volume, on a to-be-accelerated service sent by the service processing unit. Therefore, real-time sharing of an acceleration resource is implemented, and an idle status and waste of the accelerator resource are reduced.

If there is an RDMA connection between the service processing unit and the service acceleration apparatus, an interaction process of the RDMA protocol is further simplified based on a characteristic of service processing between the service processing unit and the service acceleration apparatus in the present invention, which reduces a packet transmission delay between the service processing unit and the service acceleration apparatus, reduces CPU load of the service processing unit, and improves system performance.

Further, if acceleration needs to be performed multiple times on a to-be-accelerated packet, routing information may be added to the to-be-accelerated packet, to forward the packet between multiple acceleration engines by using the routing information, so that the service packet on which acceleration needs to be performed multiple times needs neither to be transmitted multiple times between a service processing unit and an accelerator, nor to be forwarded multiple times by using an accelerator management module inside the accelerator, which reduces a delay caused by multiple times of service acceleration processing, and improves system performance.

The methods described in the present invention are not limited to the embodiments described in the Description of Embodiments. Another implementation manner obtained by a person skilled in the art according to the technical solutions of the present invention still belongs to a technical innovation scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A service acceleration apparatus, wherein the apparatus is connected to multiple service processing units and multiple acceleration engines, and the apparatus comprises a memory comprising instructions and one or more processors in communication with the memory, wherein the one or more processors execute the instructions to:

form an accelerator resource pool according to information that indicates an acceleration type and an idle acceleration ability of each acceleration engine of the multiple acceleration engines;

determine, in response to receiving an acceleration application from a first service processing unit in the multiple service processing units, a first acceleration ability and a first acceleration type that are requested by the first service processing unit;

determine that a first quantity of a first idle acceleration ability in the accelerator resource pool corresponding to the first acceleration type is greater than a second quantity that indicates a requirement of the first service processing unit;

allocate, from the accelerator resource pool according to a preset allocation granularity, the first idle acceleration ability and a connection number corresponding to the first idle acceleration ability;

send the connection number to the first service processing unit to enable the first service processing unit to establish a connection to the service acceleration apparatus according to the connection number;

send a to-be-accelerated packet that is received using the connection to at least one acceleration engine of the multiple acceleration engines that provides the first acceleration ability for acceleration processing; and send, to the first service processing unit, a result packet that is obtained from the at least one acceleration engine after acceleration processing.

2. The apparatus according to claim 1, wherein the one or more processors further execute the instructions to:
  determine, when the acceleration application indicates multiple acceleration types, multiple target acceleration engines corresponding to the multiple acceleration types,
  generate routing information according to identifier information of the multiple target acceleration engines, and add the routing information to the to-be-accelerated packet.

3. The apparatus according to claim 1, wherein the one or more processors further execute the instructions to:
  add a sequence number to the to-be-accelerated packet, wherein the sequence number identifies the to-be-accelerated packet in a sequence of to-be-accelerated packets;
  determine that the acceleration processing performed on the to-be-accelerated packet is abnormal based on a sequence number included in the result packet; and
  send a retransmission indication to the first service processing unit in response to determining that the acceleration processing is abnormal.

4. The apparatus according to claim 1, wherein the one or more processors further execute the instructions to:
  obtain a storage address carried in the to-be-accelerated packet, wherein the storage address corresponds to a first storage area in the first service processing unit; and
  write the result packet into the first storage area in accordance with a remote direct memory access (RDMA) connection established between the first service processing unit and the service acceleration apparatus.

5. The apparatus according to claim 1, wherein the one or more processors further execute the instructions to:
  receive an acceleration resource release request sent by the first service processing unit;
  delete, in response to receiving the acceleration resource release request, the connection between the first service processing unit and the service acceleration apparatus; and
  update the accelerator resource pool to indicate the first idle acceleration ability is released.

6. A service acceleration method, wherein the method is applied in a service acceleration apparatus, and the apparatus is connected to multiple service processing units and multiple acceleration engines; and the method comprises:
  forming an accelerator resource pool according to information that indicates an acceleration type and an idle acceleration ability of each acceleration engine of the multiple acceleration engines;
  determining, in response to receiving an acceleration application from a first service processing unit in the multiple service processing units, a first acceleration ability and a first acceleration type that are requested by the first service processing unit;
  determining that a first quantity of a first idle acceleration ability in the accelerator resource pool corresponding to the first acceleration type is greater than a second quantity that indicates a requirement of the first service processing unit
  allocating, from the accelerator resource pool according to a preset allocation granularity, the first idle acceleration ability and a connection number corresponding to the first idle acceleration ability;
  sending the connection number to the first service processing unit to enable the first service processing unit to establish a connection to the service acceleration apparatus according to the connection number;
  sending a to-be-accelerated packet that is received using the connection to at least one acceleration engine of the multiple acceleration engines that provides the first acceleration ability for acceleration processing; and
  sending, to the first service processing unit, a result packet that is obtained from the at least one acceleration engine after acceleration processing.

7. The method according to claim 6, the method further comprising
  determining, when the acceleration application indicates multiple acceleration types, multiple target acceleration engines corresponding to the multiple acceleration types,
  generating routing information according to identifier information of the multiple target acceleration engines, and
  adding the routing information to the to-be-accelerated packet.

8. The method according to claim 6, the method further comprising:
  adding a sequence number to the to-be-accelerated packet, wherein the sequence number identifies the to-be-accelerated packet in a sequence of to-be-accelerated packets; and
  determining that the acceleration processing performed on the to-be-accelerated packet is abnormal; and
  sending a retransmission indication to the first service processing unit in response to determining that the acceleration processing is abnormal.

9. The method according to claim 6, the method further comprising:
  obtaining a storage address carried in the to-be-accelerated packet, wherein the storage address corresponds to a first storage area in the first service processing unit; and
  writing the result packet into the first storage area in accordance with a remote direct memory access (RDMA) connection established between the first service processing unit and the service acceleration apparatus.

10. The method according to claim 6, the method further comprising:
  receiving an acceleration resource release request sent by the first service processing unit;
  deleting, in response to receiving the acceleration resource release request, the connection between the first service processing unit and the service acceleration apparatus; and
  updating the accelerator resource pool to indicate the first idle acceleration ability is released.

* * * * *